(12) United States Patent
Uchiyama (10) Patent No.: US 6,766,175 B2
(45) Date of Patent: Jul. 20, 2004

(54) CORDLESS AND WIRELESS TELEPHONE DOCKING STATION

(75) Inventor: Koji Uchiyama, Plantation, FL (US)

(73) Assignee: Waxess Technologies, Inc., Irvine, CA (US)

( * ) Notice: Subject to any disclaimer, the term of this patent is extended or adjusted under 35 U.S.C. 154(b) by 545 days.

(21) Appl. No.: 09/737,289

(22) Filed: Dec. 13, 2000

(65) Prior Publication Data

US 2002/0072390 A1 Jun. 13, 2002

(51) Int. Cl.[7] ............................. H04B 1/40; H04M 1/00
(52) U.S. Cl. ................. 455/462; 455/552.1; 455/553.1; 455/569.1; 455/74.1
(58) Field of Search ........................... 455/552.1, 553.1, 455/572, 573, 575, 569.1, 426, 557, 462, 74.1; 379/428.04, 420.04

(56) References Cited

U.S. PATENT DOCUMENTS

| | | |
|---|---|---|
| 5,276,686 A | 1/1994 | Ito |
| 5,367,558 A | 11/1994 | Gillig et al. |
| 5,550,895 A | 8/1996 | Burson et al. |
| 5,890,069 A | 3/1999 | Evans et al. |
| 5,911,120 A | 6/1999 | Jarett et al. |
| 5,991,640 A * | 11/1999 | Lilja et al. ................. 455/557 |
| 5,995,828 A | 11/1999 | Nishida |
| 5,995,839 A | 11/1999 | Coursey et al. |
| 5,999,823 A | 12/1999 | Yoneyama et al. |
| 6,058,298 A | 5/2000 | Stamegna |
| 6,073,031 A | 6/2000 | Helstab et al. |
| 6,078,822 A | 6/2000 | Tsujita |
| 6,240,297 B1 * | 5/2001 | Jadoul ........................ 455/466 |
| 6,466,799 B1 * | 10/2002 | Torrey et al. ................ 455/462 |

OTHER PUBLICATIONS

Janssen et al, Apparatus for Conducting a Conference Call Between a Wireless Line and a Land Line Using Customer Premise Equipment, Aug. 21, 2003, USPub.*
Markowitz, Cellular Attachable Cordless Telephone, Oct. 31, 2002, USPub.*

* cited by examiner

Primary Examiner—Lee Nguyen
Assistant Examiner—Yuwen Pan
(74) Attorney, Agent, or Firm—Daniel R. Brown (57) ABSTRACT

An apparatus and method of integrating a wireless telephone and a cordless telephone is taught. A docking station is used which receives a wireless telephone and electrically interfaces with in, including power, audio and data interfaces. A controller manages the interface to a transceiver, and speakerphone. A cordless telephone communicates with the transceiver, thereby enabling the utilization of a cordless telephone over a wireless telephone network. No wiring or installation is required, and the convenience and usability of the medium is enhanced.

12 Claims, 9 Drawing Sheets

CORDLESS AND WIRELESS TELEPHONE DOCKING STATION

BACKGROUND OF THE INVENTION

1. Field of the Invention

The present invention relates to telephones. More specifically, the present invention relates to integrated cordless and wireless telephones.

2. Description of the Related Art

The field of telephony has changed dramatically since the break-up of AT&T in the early 1980's. Competition has driven innovation and the range of products available to consumers has increased accordingly. One area of innovation has been the development of cordless telephones. Cordless telephones are similar to conventional corded telephones in that they are connected by wire to a local central office. But, they differ in that there is no cord between the base unit of the cordless telephone and the handset; thus, they are termed 'cordless' telephones. Cordless telephones add the convenience of mobility within the range of coverage of the cordless telephone.

The deployment of cellular service established the beginning of a wireless telephony era. The first widely adopted and implemented standard in the United States was AMPS cellular. Later, other standards were implemented, including TDMA (IS-136), CDMA (IS-95), GSM, PCS (various standards), and others. All of these wireless telephones share the characteristic that there is no local metallic loop employed to render service. Rather, a wireless telephone network is deployed by a service provider, and wide area coverage (at least respecting the coverage of a cordless telephone) is delivered via radio signals. The wireless telephones do not typically comprise a base unit; rather, the entire telephone circuitry is inside a single enclosure, including the battery.

Wireless telephones do suffer from certain disadvantages. They are physically small, and hence the user interface is rather compact and reduces the convenience of operation. The transmitter power and received signal strengths are very low, due to the battery power limitations and network infrastructure considerations. This means that radio signal strength is often time so limited that interference and noise become common annoyances during calls. The mobility of the receiver exacerbates this because of the vagaries of radio propagation, including multi-path interference, Rayleigh fading, and physical blocking of radio signal paths. In addition, wireless telephones have limited battery life, especially during extended conversation times.

Cordless telephones offer improved interfaces and performance over wireless telephones in most circumstances. They are usually larger and have more complete and convenient user interfaces. The base unit can house voice messaging systems and speakerphones. They operate in a small geographic area so that signal levels at the receivers of both the base and handset are higher, offering better receiver quieting, higher signal to noise ratios, and less interference generally. They also offer longer battery life standby and talk times, owing to their larger batteries and their more extended times at rest on a charging cradle.

The trend for many users of wireless telephones is toward using the wireless telephone as the principal communications device, even over the traditional wired and corded telephones. Users merely keep their wireless telephone with them at all times, whether during travel, at home, or at work. Thus, they are readily reachable by calling to the wireless telephone number. However, this means that the aforementioned limitations of wireless telephones are always present for such users. It is known in the art to utilize a base unit with a wireless telephone that offers battery charging, hands free operation, and even interfaces to RJ-11 devices, such as wired telephones. However, such devices are cumbersome to use, limit mobility, and may require installation procedures beyond the skill level of average users. Thus, there is a need in the art for an integration apparatus and method to improve upon the utilization of a wireless telephone in a local geographic area while maintaining mobility through the use of cordless telephony technology.

SUMMARY OF THE INVENTION

The need in the art is addressed by the apparatus and methods of the present invention. A docking station for interconnecting telephone calls between a wireless telephone and a cordless telephone is taught. The docking station comprises an electrical interface, having a plurality of connectors for coupling audio and data signals with the wireless telephone, and a transceiver operable to communicate telephone calls via radio signals to the cordless telephone. The transceiver is coupled to at least a first audio signal connector in the electrical interface. The docking station also includes a controller coupled to the transceiver, and coupled to at least a first data connector in the electrical interface. The controller is operable to communicate data signals with the wireless telephone when coupled to the electrical interface, and is also operable to process telephone calls between the wireless telephone and the cordless telephone via the transceiver.

In a refinement of the forgoing invention the electrical interface is aligned with a socket in a case of the docking station, and a removably mountable interface adapter is used. The interface adapter includes a docking station electrical interface adapted to connect with the electrical interface in the socket and a wireless telephone cradle formed to received and support the wireless telephone. The cradle has a wireless telephone electrical interface adapted to connect with the wireless telephone. The interface adapter also has an interface circuit operable to interconnect the docking station electrical interface with the wireless telephone electrical interface. In a further refinement, the interface circuit utilizes electrical components operable to adapt wireless telephone signals to signals at the electrical interface. Thus, differences in signal levels between the docking station interface and the particular wireless telephone used can be adjusted for.

In another refinement, the docking station invention also includes a power supply coupled to at least a first connector in the electrical interface, and coupled to the transceiver and the controller. Thus, where the wireless telephone operates from rechargeable batteries, and where the interface circuit has a first connector in the electrical interface to the wireless telephone, it is made operable to charge the rechargeable batteries in the wireless telephone, eliminating the need to use the conventional wireless telephone charging devices. To further refine the simplicity and convenience, where the cordless telephone operates from rechargeable batteries, the docking station is further refined. It includes a cordless telephone cradle disposed upon a case enclosing the docking station, and a cordless telephone electrical interface aligned with the cordless telephone cradle. The power supply is coupled to at least a first conductor in the cordless telephone electrical interface, and is operable to charge the cordless telephone rechargeable batteries, in addition to charging the wireless telephone.

In another refinement of the docking station, it also incorporates a speakerphone having an audio interface and a control interface. The controller is coupled to the speakerphone control interface and is operable to selectively coupled the speakerphone audio interface to the electrical interface audio signals, thereby enabling the speakerphone function for telephone calls on the wireless telephone.

Another apparatus is taught by the present invention that is a docking station for interconnecting telephone calls between a wireless telephone and a cordless telephone, wherein both of the wireless telephone and the cordless telephone operate from rechargeable batteries. The docking station comprises a case and an electrical interface aligned with a socket in the case, and has several connectors for coupling power, audio and data signals with the wireless telephone. It also has a removably mountable interface adapter. The interface adapter comprises a docking station electrical interface adapted to connect with the electrical interface in the socket of the case and a wireless telephone cradle formed to received and support the wireless telephone. The cradle has a wireless telephone electrical interface adapted to connect with the wireless telephone. The interface also has an interface circuit operable to interconnect the docking station electrical interface with the wireless telephone electrical interface. The docking station also has a transceiver operable to communicate telephone calls via radio signals to the cordless telephone, and the transceiver is coupled to at least a first audio signal connector in the electrical interface. The docking station also has a controller coupled to the transceiver, and coupled to at least a first data connector in the electrical interface, the controller being operable to communicate data signals with the wireless telephone when coupled to the electrical interface, and being operable to process telephone calls between the wireless telephone and the cordless telephone via the transceiver. In addition, the docking station has a power supply coupled to at least a first connector in the electrical interface, and coupled to the transceiver and the controller. The interface circuit couples the first connector in the electrical interface to the wireless telephone, and is operable to charge the rechargeable batteries in the wireless telephone. A cordless telephone cradle is disposed upon the case and has a cordless telephone electrical interface aligned with it. The power supply is coupled to a first conductor in the cordless telephone electrical interface, and is operable to charge the cordless telephone rechargeable batteries. A speakerphone having an audio interface and a control interface is also incorporated into the docking station. The controller is coupled to the speakerphone control interface and is operable to selectively coupled the speakerphone audio interface to the electrical interface audio signals, thereby enabling the speakerphone function for telephone calls on the wireless telephone while the wireless telephone is interfaced to the electrical interface.

The present invention also teaches a method of interconnecting telephone calls between a wireless telephone, having a first electrical interface, and a cordless telephone using a docking station that has a second electrical interface and a transceiver, which is operable to couple telephone calls, via radio waves, with the cordless telephone. The second electrical interface has at least a first audio connector coupled to the transceiver and at least a first data connector coupled to a controller in the docking station. The method comprises the steps of connecting the first electrical interface to the second electrical interface, receiving a ring data signal by the controller from the wireless telephone through the data connector, and, in response to receiving the ring data signal, coupling audio signals between the audio connector and the cordless telephone through the transceiver.

Another method comprises the steps of connecting the first electrical interface to the second electrical interface, entering a telephone number into a keypad on the cordless telephone, communicating the telephone number to the controller via the transceiver, establishing a wireless telephone call by sending the telephone number from the controller to the wireless telephone through the at least a first data connector, and coupling audio signals between the at least a first audio connector and the cordless telephone through the transceiver during the telephone call.

Another method involves the transferring of data between a wireless telephone, having a first electrical interface, and a cordless telephone using a docking station having a second electrical interface. The docking station has a transceiver operable to couple information, via radio waves, with the cordless telephone. The docking station also has a controller coupled to the second electrical interface and also coupled to the transceiver. The method comprises the steps of detecting the presence of the wireless telephone at the docking station upon the connection of the first electrical interface to the second electrical interface. Then, transferring data from the wireless telephone to the transceiver by the controller. Next, transmitting the data by the transceiver to the cordless telephone. And finally, storing the data in a memory in the cordless telephone, in either of the handset or base portion inside the docking station. The data may be the list of telephone numbers and other associated data from a repertoire memory dialer.

DESCRIPTION OF THE INVENTION

Illustrative embodiments and exemplary applications will now be described with reference to the accompanying drawings to disclose the advantageous teachings of the present invention. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
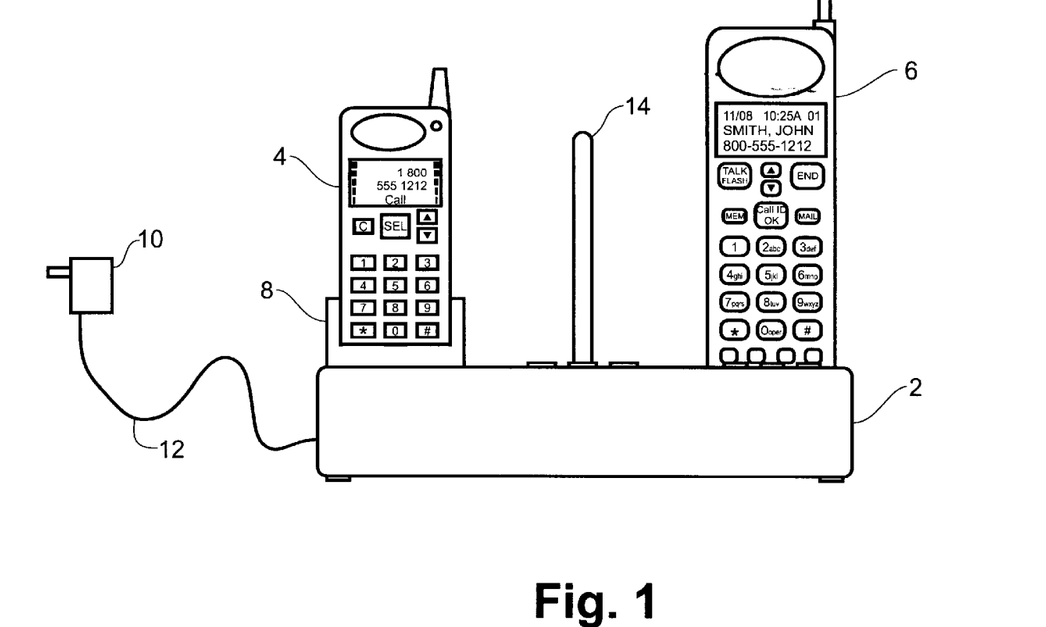
FIG. 1 is a drawing of an illustrative embodiment of the present invention.

Reference is directed to FIG. 1, which is drawing of an illustrative embodiment cordless and wireless telephone docking station according to the present invention. The docking station 2 accepts a cordless telephone 6 and a wireless telephone 4. The wireless telephone rests in the cradle of an interface adapter 8. While the illustrative embodiment illustrated in FIG. 1 shows that the wireless telephone 4 and cordless telephone 6 rest in a vertical position, it is to be understood that a horizontal position could equally be employed. In fact, any cradle arrangement, as are understood by those of ordinary skill in the art could be utilized with respect to the present invention. The purpose if the interface adapter 8 is to adapt the mechanical and electrical interface of various types and styles of wireless telephones 4 to the docking station 2. Thus, a single docking station 2 design can be employed for a wide variety of wireless telephones 4 by simply selecting the appropriate interface adapter 8. The wireless telephone may be of any of the presently available wireless telephone technologies, including but not limited to AMPS cellular, TDMA cellular, CDMA cellular, PCS, GSM, or other U.S. or international standards, or private systems, or, may be adapted for yet to be released or developed wireless telephone systems and standards, throughout the world.

The docking station 2 has an antenna 14 that is used to communicate with the cordless telephone handset 6 via radio waves. This enable to the cordless telephone to operate in the vicinity of the docking station 2 without the user being tethered by a cord coupled to the handset. There is no need to install any wiring associated with the operation of the present invention. This feature gives the invention a measure of portability of installation and operation not available with wireline connected systems. Within the docking station 2, a cordless telephone transceiver unit (not shown) is coupled to the wireless telephone 4 via interface adapter 8. During a call, and for other telephone operations, the wireless telephone 4 and the cordless telephone 6 are interconnected. Thus, the user of the present invention will have all of the advantages of a conventional cordless telephone without the need for wire-line service, and without the disadvantages generally associated with a wireless telephone. Since the wireless telephone is in a fixed position, and that position can be selected where good radio performance is realized, the quality of the wireless communications is improved. Multi-path distortion and Rayleigh fading are improved significantly.

The illustrative embodiment taught herein is with respect to a single cordless telephone interconnected to the wireless telephone. That cordless telephone having a feature set commensurate with the contemporary state or the cordless telephone art. However, the principle interface is between the wireless telephone and the cordless telephone base transceiver circuitry. The ultimate interconnection to the cordless telephone handset is via radio waves. Therefore, it will be readily apparent to those or ordinary skill in the art that all of the features and capabilities understood as applicable to cordless telephony generally, whether presently understood or later developed, are equally applicable to the present invention. Thus, for example, a cordless telephone employing multiple handsets, each uniquely identified, could communication with the present invention docking station, as well as with one another. It is the novel interconnection to the public switched telephone network, through the docking station according to the present invention, and the wireless telephone that is the essence of the advancement in the art.

Another added measure a convenience is obtained by providing a power supply adapter 10, which is coupled to the docking station 2 via power cord 12. The power supply adapter 10 provides operating power to the docking station 2 during normal operation. It also provides a source of current for recharging the rechargeable batteries in both of the cordless telephone 6 and the wireless telephone 4. Without the use of the present invention, the user of a wireless telephone would require another means of recharging the batteries in the wireless phone. Since a user of the present invention will place the wireless telephone 4 in the cradle of the interface adapter 8 during extended periods when the wireless telephone 4 is used with the present invention, the ability to charge the batteries of the wireless telephone 4 with the present invention advantageously eliminates the need for an alternative charging apparatus. Since different wireless telephones may operate on difference supply voltages, the present invention provides that the interface adapter 8, or other circuit within the docking station 2, adapts the power supply 10 output voltage to the voltage required by the particular wireless telephone 4 connected to the docking station 2. The circuits required to adapt the voltage may be a resistive voltage divider, a power supply circuit, or other power circuit as are understood by those of ordinary skill in the art. The power supply 10 can be either the wall socket mount device 10, as shown, or can be integrated into the docking station 2.

Figure 2:
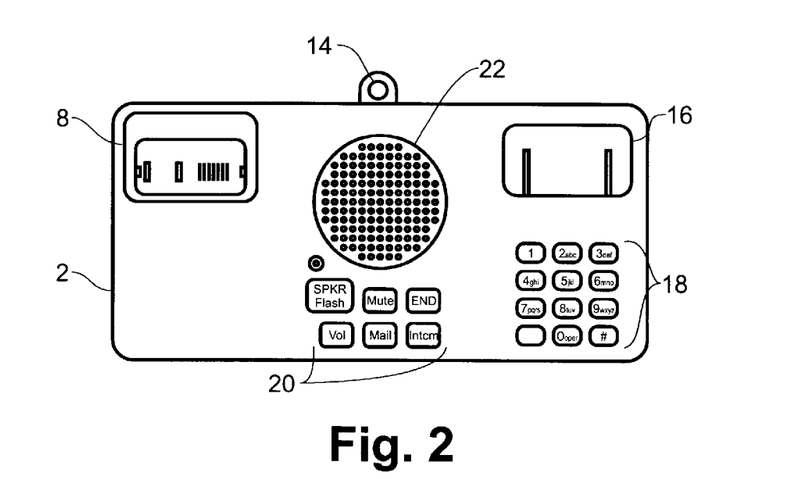
FIG. 2 is a drawing of the base unit in an illustrative embodiment of the present invention.

Reference is directed to FIG. 2, which is a drawing of the user interface of an illustrative embodiment of the present invention. The wireless telephone and cordless telephone do not appear in this FIG. 2. The docking station 2 includes a case that is fabricated from plastic in the preferred embodiment, but could be made from any suitable material. The docking station 2 also includes a cordless telephone cradle 16 which is primarily a mechanical interface used to support the cordless telephone (not shown) while it is resting and not in use. In modern cordless telephones, the cradle 16 typically includes battery charging contacts, and sometimes other signal interface contacts. The docking station 2 also includes a conventional telephone keypad 18 that is used by the user to enter telephone numbers and other call progress key sequences, as are well understood by those of ordinary skill in the art. An antenna 14 is coupled to a transceiver (not shown) within the docking station and is used for establishing a radio communications link between the cordless telephone (not shown) and the docking station 2. In the preferred embodiment, a 900 MHz transceiver is employed, however, any suitable frequency of operation may be used, as is well understood by those of ordinary skill in the art.

In FIG. 2, the wireless telephone (not shown) rests in a wireless telephone cradle, which is a part of the wireless telephone interface adapter 8. The details of the interface adapter 8, will be more fully discussed hereinafter. The preferred embodiment of the present invention also includes a speaker/microphone 22 that is used with a speakerphone function. The speakerphone function, and other docking station features, is controlled by function keys 20. A more detailed discussion of some of these features appears below.

Figure 3A:
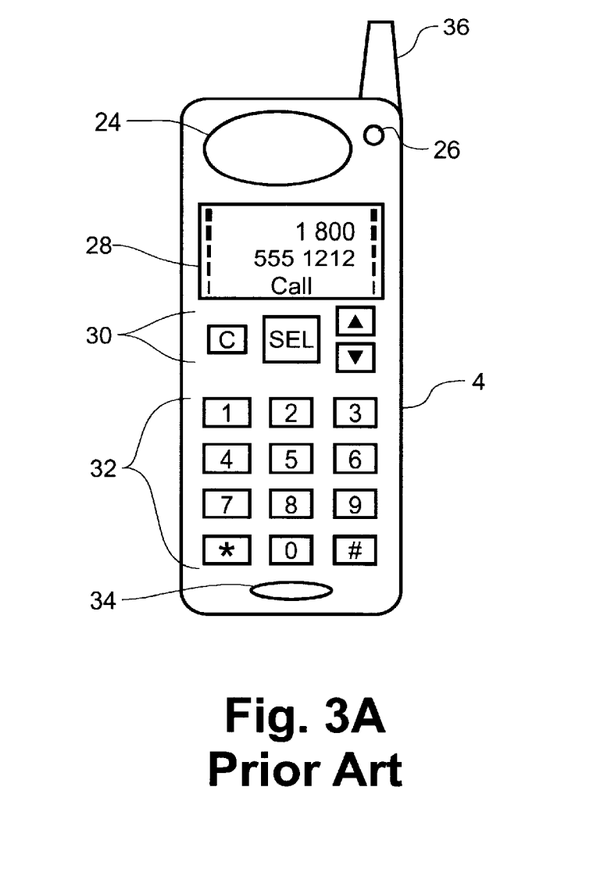
FIG. 3A is a drawing of the user interface of a prior art wireless telephone.
Figure 3B:
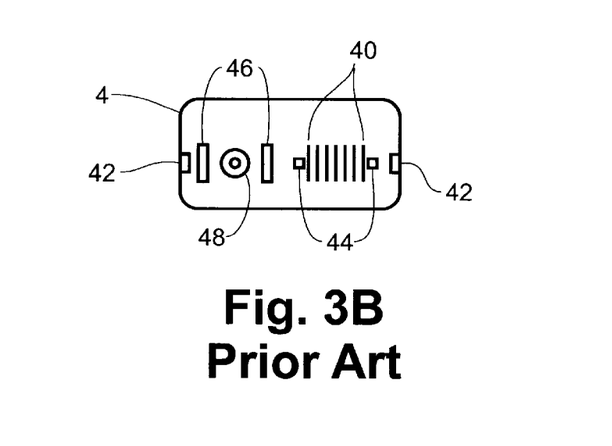
FIG. 3B is a drawing of the electrical interface of a prior art wireless telephone.

The present invention can accommodate any number of different types of wireless telephones through advantageous use of the interface adapter. By way of example and reference, and not for illustration of any limitations, FIG. 3A and 3B illustrate an exemplar prior art wireless telephone suitable for interface to the present invention docking station. Most wireless telephones 4 share common characteristics, and the present invention takes advantage of this fact. In FIG. 3A, which is a view of the user interface of a wireless telephone 4, there is an earphone speaker 24, a display 28, a group of function keys 30, a conventional telephone keypad 32, a microphone 34, a power switch 26, and an antenna 36. Such wireless telephones typically employ a menu selection interface of various wireless telephone functions, which typically includes a repertoire memory dialer. FIG. 3B illustrates the mechanical and electrical interface of a typical wireless telephone. Wireless telephone manufacturers and suppliers do provide adjunct products designed to operate in conjunction with their wireless telephones. For example, headset/microphones are offered. So too are hands-free systems for use in motor vehicles, battery charging cradles, and interfaces for modems and other data ports. Such items are well understood by those of ordinary skill in the art. To meet the interface requirements of such adjunct devices, most prior art wireless telephone include an electrical interface, accessible from the exterior of the telephone, which presents the transmit and receive audio signals as well as a data interface and a power supply connection. FIG. 3B illustrates such an interface. A typical wireless telephone interface includes a coaxial power supply connector 48, typically used with a wall-jack transformer. But, there is also available separate power supply terminals 46 that allow simple interface to cradle-type battery chargers and other mountable interfaces. The typical wireless telephone 4 also includes a bus-type connector 40 that has a plurality of electrical conductors and may include transmit and receive audio signals, transmit and receive data signals, system ground, and system power supply signals. The interface protocol and specifications for such an interface can be obtained from the wireless telephone manufacturer either freely or through a licensing arrangement, or can be reverse engineered if necessary. Of course, different wireless telephones employ different physical interfaces, which may be of the form of a straight bus connector, for example.

FIG. 3B also illustrates part of the mechanical interface of a wireless telephone 4. These may include notches, recesses or pins 42 used to align the wireless telephone, and may include other alignment notches, recesses or pins 44 used to particularly align the electrical connector 42. In addition, the physical size, shape, and dimensions of the wireless telephone are used in designing a cradle, on which it will rest or be inserted into.

Figure 4A:
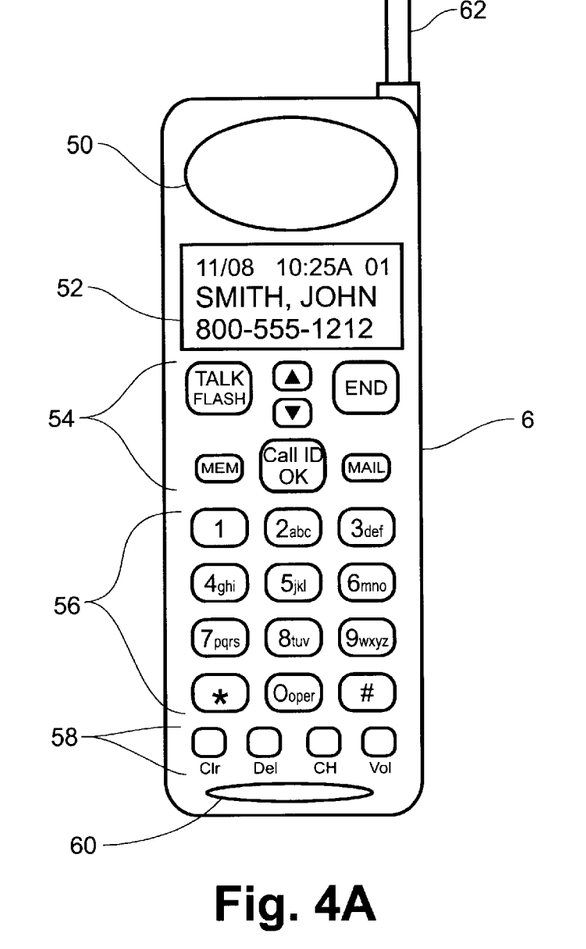
FIG. 4A is a drawing of the user interface of a cordless telephone in an illustrative embodiment of the present invention.
Figure 4B:
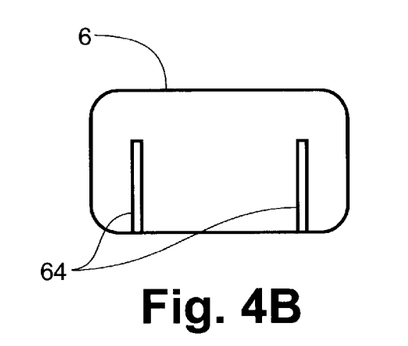
FIG. 4B is a drawing of the electrical interface of a cordless telephone in an illustrative embodiment of the present invention.

FIGS. 4A and 4B illustrate a cordless telephone for use with present invention docking station. In FIG. 4A, the user interface on the front of the cordless telephone 6 is illustrated. An earphone speaker 50 and a display 52 are present along with a grouping of function keys 54. A conventional telephone keypad 56 is typically used as well as special function keys 58 and a microphone 60. Also, an antenna 62 which is coupled to an internal transceiver (not shown) that enables the cordless telephone 6 to communicate with the docking station transceiver. Cordless telephones also typically include a repertoire memory dialer function, similar to the wireless memory dialer mentioned above. One feature of the present invention is the ability of the docking station to recall the memory dialer information from the wireless telephone and transmit a copy of this information to the cordless handset. Thus, the user of the present invention doesn't need to manually enter the dialer information into both devices. FIG. 4B illustrates the mechanical and electrical interface of the cordless telephone 6. The preferred embodiment employs simple electrical contacts 64 for the purpose of battery charging and for detection of the on-hook condition. Other electrical interfaces can be used which include other signals, and perhaps a data transfer function so that the radio link is not used to transfer information to the cordless telephone 6. Such interfaces are well understood by those of ordinary skill in the art. The physical dimensions of the base of the cordless telephone 6 defines the mechanical interface.

Figure 5:
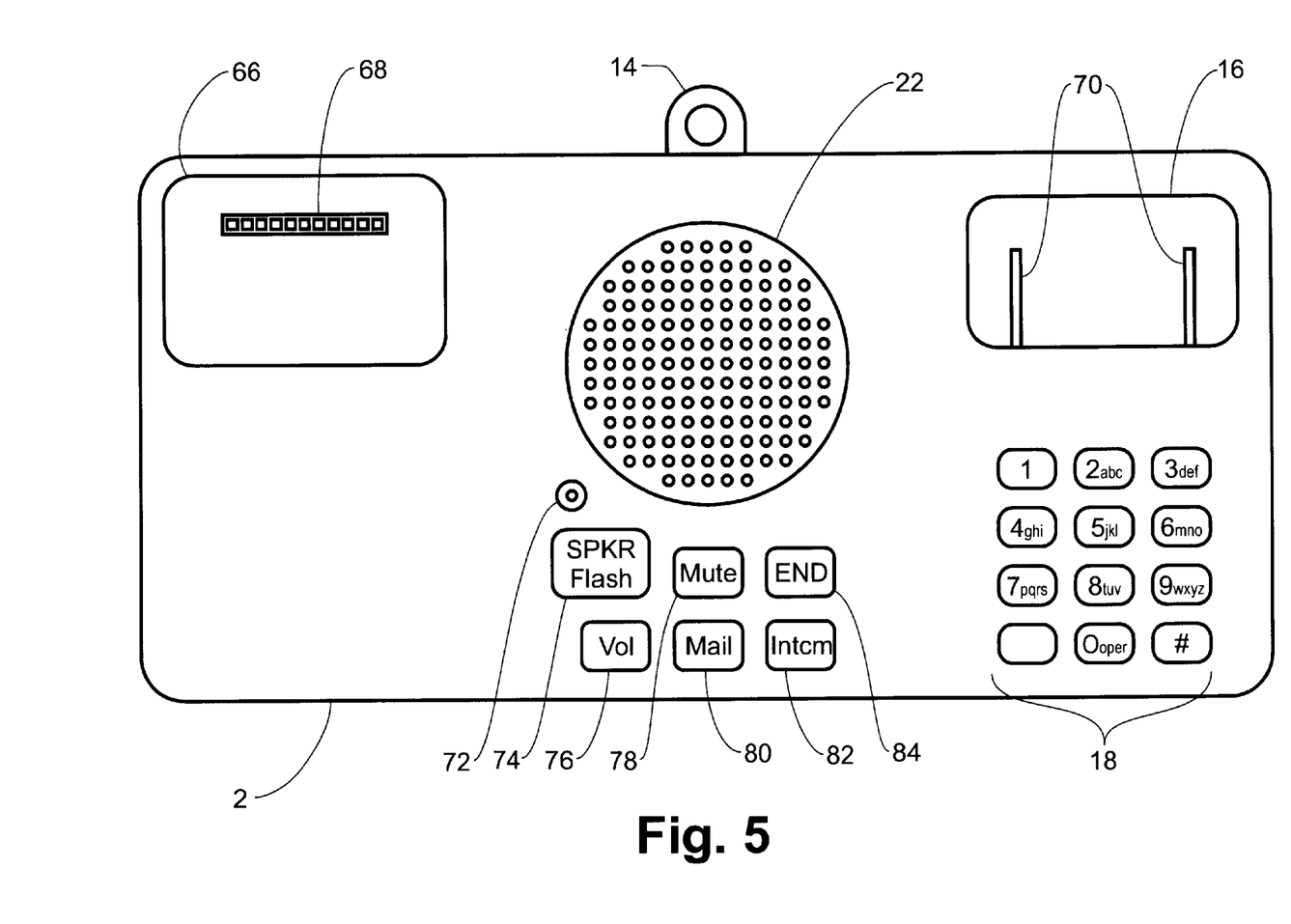
FIG. 5 is a drawing of the base unit in an illustrative embodiment of the present invention.

FIG. 5 is a detail view of the user interface and top of the docking station according to an illustrative embodiment of the present invention. The docking station 2 is formed from injection-molded plastic, or other suitable fabrication material and techniques, and houses components of the device. As was discussed earlier, there is a cordless telephone cradle 16 that supports the cordless telephone (not shown) and provides battery charging current though electrical contacts 70, which align with mating electrical contacts on the bottom of the cordless telephone. A conventional telephone keypad 18 is disposed on the surface of the docking station 2. The keypad 18 comprises the usual digits zero through nine as well as the asterisk and pound keys, familiar to those or ordinary skill. This keypad 18 enables the user to enter telephone numbers from the docking station 2 directly, thus avoiding the use of the cordless telephone and wireless telephone keypads mentioned above. The docking station keypad 18 is of particular use when the speakerphone function is enabled, allowing the user to place a speakerphone originated call from the docking station 2 directly.

A speaker/microphone 22 is disposed upon the surface of the docking station 2. It is used in connection with the function key 74 which enables and disables the speakerphone function in the docking station 2. The basic operation of the speakerphone function will be discussed more fully hereinafter, but essentially, when a call is in progress and the speakerphone function us activated, the speaker phone is coupled to the transmit and receive audio from the wireless phone and the user is able to communicate through the wireless phone, without the cordless phone, using a hands-free speakerphone. A mute function is provided using the MUTE function key 78. This function disables the microphone to transmit audio path so that the party at the far end of the call does not hear audio from the docking station. An END key 84 provides for the termination of a telephone call in progress from the docking station 2. A VOL, volume key 76 allows the user to increment and decrement the volume of the speakerphone speaker 22. The MAIL function key 80 is used in conjunction with the wireless phone voice mail feature and is programmable for the particular wireless phone used with the docking station 2. Finally, an INTCM function key 84 enables an intercom function allowing the docking station 2 to communicate with the cordless phone over the radio link in an intercom mode of operation. It is to be noted that this function is available even when no wireless phone is connected to the docking station 2.

The docking station 2 in FIG. 5 also illustrates the wireless telephone interface socket 66. This socket includes an electrical connector 68, which operates according to the design specification of the docking station. In this sense, the interface socket 66 and electrical interface connector 68 are the generic interface that is adapted to the particular wireless telephone to be supported through the use of the interface adapter (not shown). Therefore, the electrical interface 68 comprises signal conductors which form the superset of all the wireless telephone connections that are to be supported by the docking station. This includes, but is not limited to, transmit audio, receive audio, transmit serial data, receive serial data, clock, data set ready (RS-232), data terminal ready (RS-232), power, ground, and other needed call progress interface signals. Those of ordinary skill in the art will appreciate the interface requirements.

Figure 6A:
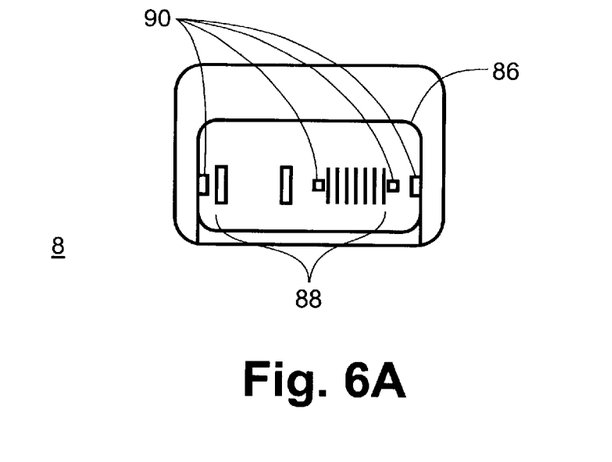
FIG. 6A is a drawing of the wireless telephone interface of the interface adapter in an illustrative embodiment of the present invention.
Figure 6B:
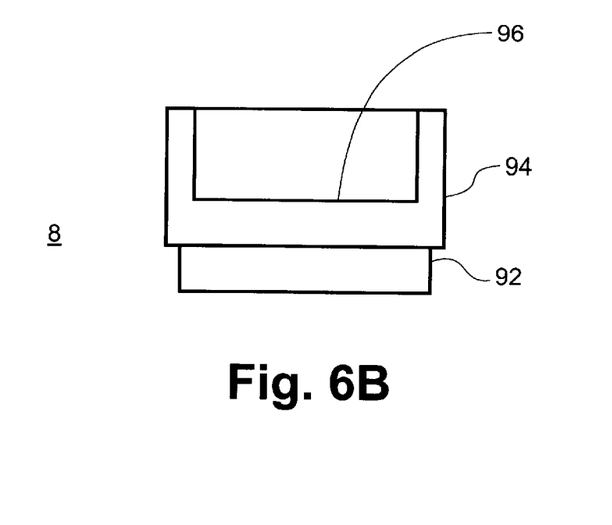
FIG. 6B is a front view of the interface adapter in an illustrative embodiment of the present invention.
Figure 6C:
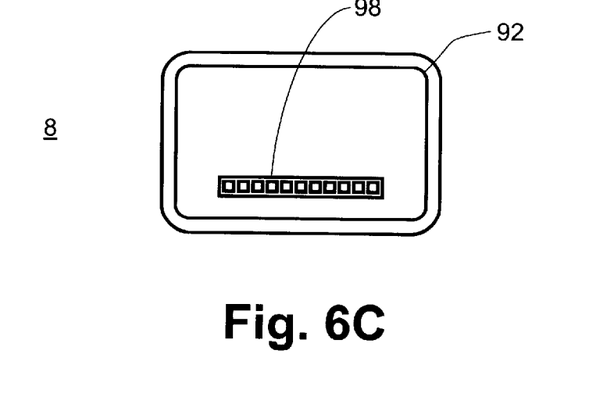
FIG. 6C is a drawing of the base unit interface of the interface adapter in an illustrative embodiment of the present invention.

FIGS. 6A, 6B, and 6C illustrate the interface adapter 8 according to an illustrative embodiment of the present invention. FIG. 6B is a front view of the interface adapter 8. The adapter 8 is formed from molded plastic 94 in a suitable plug shape 92 to fit the interface socket of the docking station. Other materials can be used as well. The upper portion of the interface adapter 8 is molded as a cradle 96 designed to accommodate the physical dimensions of the particular wireless telephone that is to be interfaced to the docking station. FIG. 6C illustrates the bottom view of the illustrative embodiment interface adapter 8. The interface plug shape 92 is of such size to fit the interface socket in the docking station. Thus, the interface adapter is removably mountable to and from the docking station. The extent of the complexity of the interconnection between these items is at the discretion of the designer. In some applications, it may be desirable and preferable to have the integration of the interface adapter and docking station be done by and end user with a simple plugging action, so that the type of wireless telephone support can be changed at will by the end user. On the other hand, the removable nature of the interface may be limited by the use of special tools and fixtures so that only a dealer, distributor, or manufacturer is able to make the change from one wireless telephone type to another. The plug 92 includes an interface connector 98, which is positioned and sized to mate with the interface socket electrical connector in the docking station. FIG. 6A illustrates the top of the interface adapter 8. A cradle 86 is formed that is sized to fit and support the wireless telephone the particular interface adapter is designed to accommodate. The electrical interface 88 is sized and positioned to accommodate the electrical interface of the wireless telephone. Alignment recesses, pins, or cut-outs 90 are formed into the cradle; again, positioned and sized to accommodate the wireless telephone to be interfaced, as was described with respect to FIG. 3B.

One important function of the interface adapter 8 is to interconnect the electrical signals between the interface connector 98 and the wireless telephone interface connectors 88. If the signals levels in the docking station interface 98 match those required by the wireless telephone, then all that is needed is to interconnect the docking station connectors 98 to the wireless telephone connectors 88. However, where there is a requirement to change signal levels, such as from positive and negative going RS-232 to single sided RS-232, then a small amount of circuitry can be placed within the housing 94 of interface adapter 8 to make the needed adjustments to signal levels. Similarly, if a particular wireless telephone requires a supply voltage different that available in the docking station, then a suitable power supply circuit can be built into the interface adapter 8. Those of ordinary skill in the art will appreciate the circuit designed available and required to meet such interface adaptations.

Figure 7:
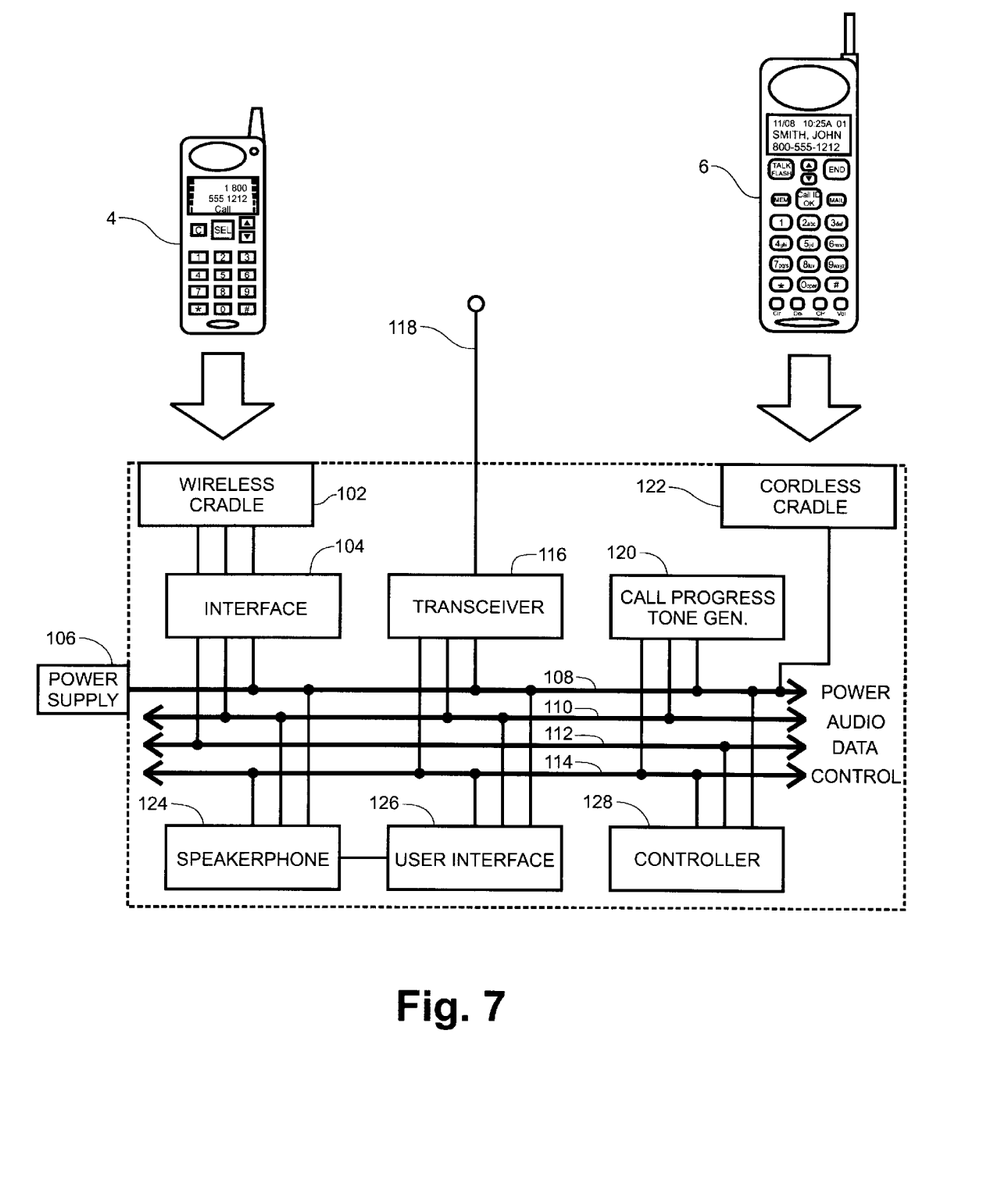
FIG. 7 is a functional block diagram of an illustrative embodiment of the present invention.

Reference is directed to FIG. 7, which is a functional block diagram of an illustrative embodiment according to the present invention. The cordless telephone 6 and wireless telephone 4 rest in and connect to their respective interface cradles 122 and 102. The functional structure of the docking station can readily be modeled as bus architecture, having four basic bus paths. These include a power bus 108, audio signal bus 110, data signal bus 112, and internal control bus 114. The function of the power bus 108 is to receive electric power from the power supply 106 and distribute it within the docking station and to the wireless telephone 4 and cordless telephones 6 for power supply and battery charging. The audio bus 110 carries the transmit and receive audio signals between the wireless telephone 4, the speakerphone 124, and the transceiver 116. The data bus 112 carries wireless telephone 4 data signals between the wireless telephone and the controller 128 in the docking station. The control bus 128 carries control information from controller 128 to the wireless telephone 4, the speakerphone 124, the user interface 126, the transceiver 116, and the call progress tone generator 120. It is to be understood that the bus structure is meant as a model of the architecture and that formally laid out bus structures on a printed circuit board are not required. Rather, this is an exemplary embodiment, and those of ordinary skill in the art will appreciate that other circuit topologies can be employed to achieve the same or similar results.

More specifically, respecting FIG. 7, the wireless telephone 4 coupled to the wireless cradle 102, both mechanically and electrically. An interface 104 interconnects and adapts the signal levels, as was discussed herein before. The data signals from the wireless telephone 4 are thus coupled to the internal data bus 112. So too are transmit and receive audio signals from the wireless telephone 4 coupled to the audio bus 110. Power is delivered from the power bus 108 to the wireless telephone 4 though interface 104, with power level conversion if needed, via wireless cradle 102. A transceiver 116 is also coupled to the audio bus 110. Thus, the audio signals from the wireless telephone 4 can be coupled to the transceiver from broadcast and reception to and from the cordless telephone 6. The general operation of the transceiver, however, is controlled by controller 128 by communications thought the control bus 114. Therefore, the wireless telephone 4 does not generally control the docking station, rather controller 128 controls the docking station functions though execution of software programs.

The controller 128 may be any of the large variety of microprocessor, microcontrollers, or even digital signal processors currently available, or which may later become available. Such a controller will typically include memory for storage of source code software, RAM, and other memory as needed to implement features and functions of the device. Those of ordinary skill in the art will appreciate the proper selection and implementation of a suitable controller device.

Again referring to FIG. 7, the controller 128 executes software to control transceiver 116 in its operation as a cordless telephone base transceiver. The air protocol between the transceiver 116 and cordless telephone 6 are similar in most respects to a conventional cordless telephone, as is understood by those of ordinary skill in the art. One principle difference is that the source of communications signals is not a telephone line, but the audio bus 110, and, the transmit and receive audio signals are derived from the wireless telephone 4 through interface 104. The signaling standards from the electrical interface of the wireless telephone 4 differ substantially, especially respecting call progress tones, as compared to a twisted pair metallic local loop telephone line (a so called 'POTS' line). Yet, the cordless telephone functionality is more graceful, and user friendly, where the convention call progress tones are provided. The present invention satisfies this demand by incorporating a call progress tone generator 120. This device is operable to produce call progress tones, including ring, dial tone, busy tone, reorder tone, and so forth. These tones are selected by the controller 128 and are coupled to the audio bus 110. In this way, the controller can generate and couple call progress tones to the transceiver, and ultimately the cordless telephone 6, thus emulating a conventional wired cordless telephone. The sequences and operation of call progress tones are well understood by those of ordinary skill in the art.

A user interface 126, which includes the standard telephone keypad and the function keys described earlier, is coupled to the control bus 114 so that key actuations are sensed by controller 128. The speakerphone 124 is a part of the user interface, and the audio signals are derived from the audio bus 110. When the speakerphone key is actuated, this actuation is sensed by the controller 128 which controls switches to couple the wireless telephone audio signals to the loudspeaker and microphone circuits in the speakerphone. Thus, the transmit and receive audio signals from the wireless telephone 4 are coupled to the speakerphone, enabling speakerphone functionality for the wireless telephone.

Figure 8:
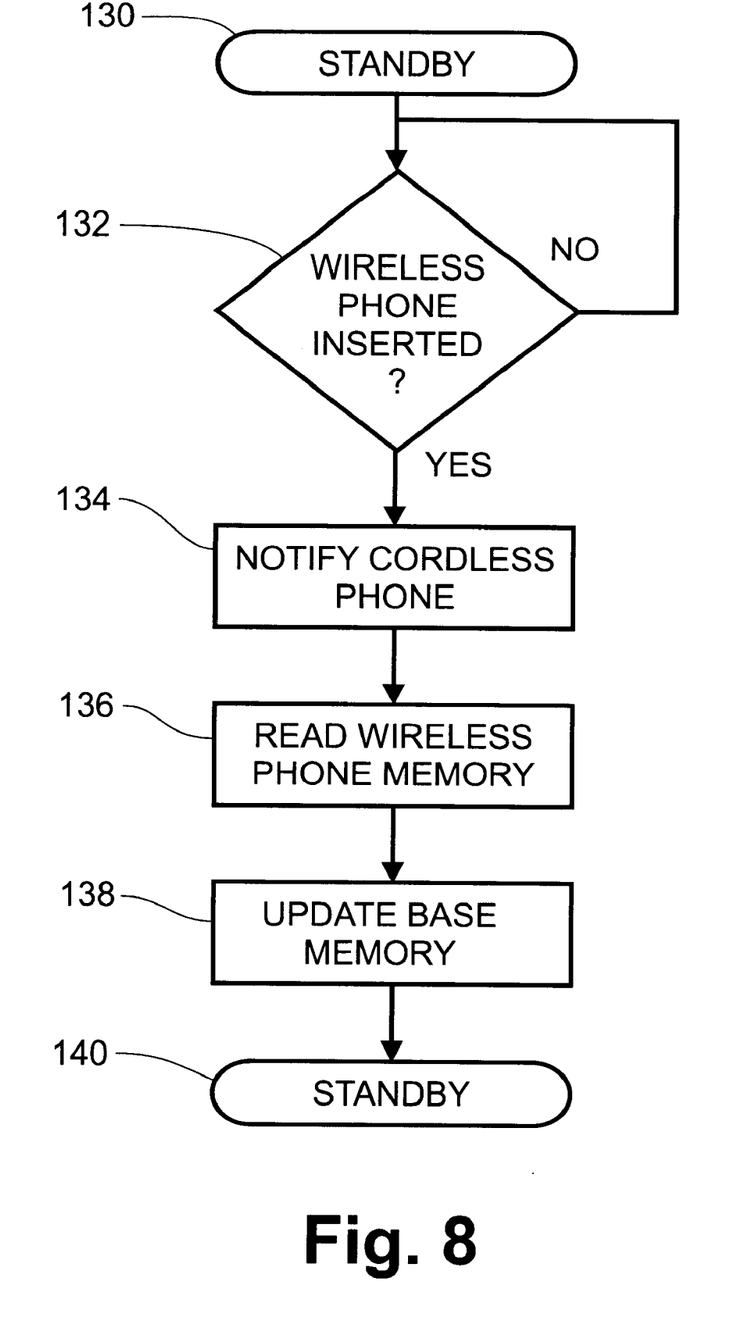
FIG. 8 is a flow diagram of the initialization process in an illustrative embodiment of the present invention.

Reference is directed to FIG. 8, which is a flow diagram of the initialization routine according to the present invention. The docking station controller software rests in a standby mode 130 when there is no activity in the device. When the wireless telephone is inserted into the cradle, at step 132, this action is sensed by the coupling of one or more signals between the wireless telephone and the docking station. If the wireless telephone is inserted at step 132, then the docking station notifies the cordless telephone by sending a message over the radio link. The notification may be alerted to the user by sounding tone or illuminating a display icon, or other means. This function serves to indicate that the cordless telephone is now operable to place and receive telephone calls through the wireless telephone. At step 136, the docking station controller requests and reads the memory dialer data stored in the wireless telephone into the memory of the controller, step 138, in the docking station. In an alternative embodiment, the memory dialer data may be stored directly into the cordless telephone handset. It should be appreciated that this function is available only in those wireless telephones that support such memory transfers. This information can also be subsequently transferred to the memory in the cordless telephone by transmitting the memory data over the radio link between the docking station and the cordless telephone. Having completed the initialization and memory transfer operation, the device returns to the standby state at step 140.

Figure 9:
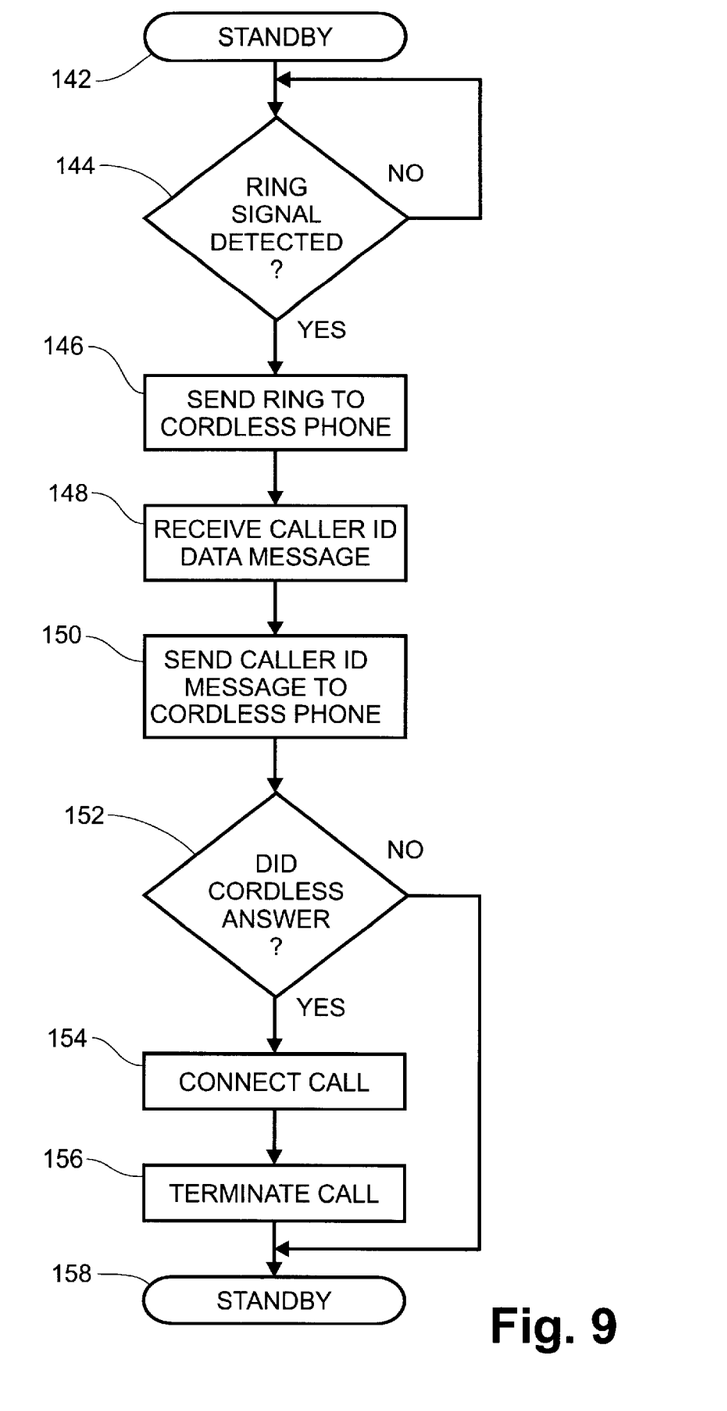
FIG. 9 is a flow diagram of the incoming call process in an illustrative embodiment of the present invention.

FIG. 9 is a software flow diagram of the process of receiving an incoming call according to the present invention. While in the standby state, step 142, the docking station continuously monitors for the activation of a ring signal. If this occurs, at step 144, then the occurrence of a ring signal originating in the wireless telephone is sent to the cordless telephone at step 146. The cordless telephone alerts the user by sounding an audible ring tone, or other means. If caller ID information is received by the wireless telephone, which is dependent upon such a feature being offered by the carrier and on the wireless telephone features available, then this information is sent from the docking station to the cordless telephone, via the radio link, at step 150. The cordless telephone displays the caller ID information, thus allowing the user to elect to answer the call, if desired. At step 152, if the call is not answered, then the controller returns to the standby mode at step 158, when the ring signal terminates or times out. On the other hand, at step 152, if the call is answered, then the controller connects the wireless telephone audio signals to the transceiver audio connections and the call is connected between the wireless telephone and the cordless telephone. The conversation, or other telephony service proceeds until one end terminates the call at step 156. Upon termination, the docking station returns to the standby mode at step 158.

Figure 10:
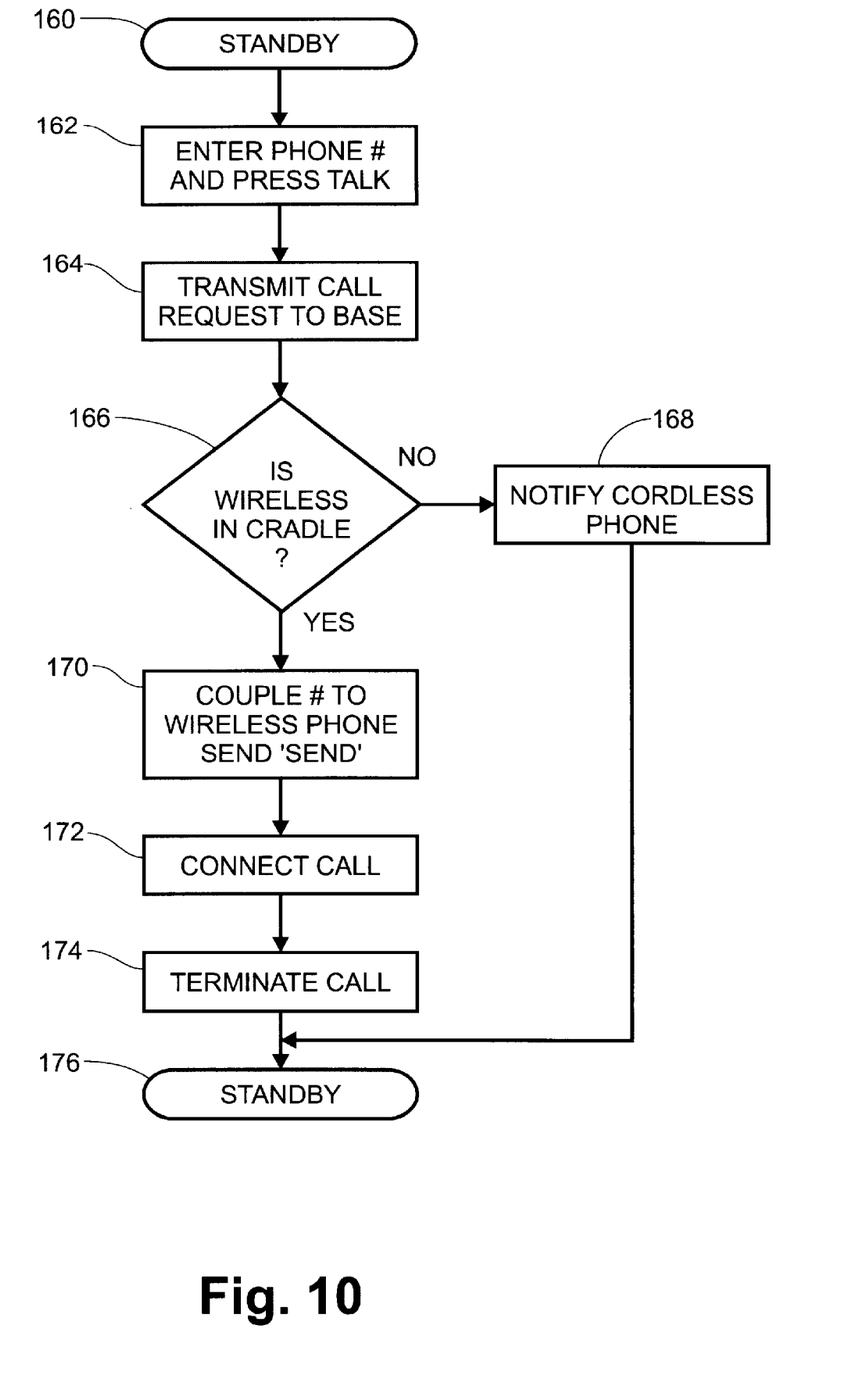
FIG. 10 is a flow diagram of the outgoing call process in an illustrative embodiment of the present invention.

FIG. 10 is a software flow diagram of the outgoing call process according to the present invention. While in the standby mode, at step 160, the user enters a telephone number into the cordless telephone and presses the TALK key on the cordless telephone, at step 162. This action causes the cordless telephone to send the entered telephone number to the docking station via the radio link at step 164. If the wireless telephone is not in the cradle of the docking station, the docking station notifies the cordless telephone of this unavailability at step 168, and the process returns to the standby mode at step 176. On the other hand, at step 166, if the wireless telephone is in the cradle, the docking station controller couples the dialed telephone number to the wireless telephone via the data bus, and also couples a 'send' command, which causes the wireless telephone to originate the call to the dialed number. The call is connected at step 172 and proceeds until one of the parties terminates the cal at step 174. Finally, the process returns to the standby mode at step 176.

Thus, the present invention has been described herein with reference to a particular embodiment for a particular application. It is therefore intended by the appended claims to cover any and all such applications, modifications and embodiments within the scope of the present invention.

Accordingly,

What is claimed is:

1. A docking station for interconnecting telephone calls between a wireless telephone, which accesses telephone service from a wireless telephone network, and a cordless telephone handset, which employs radio waves instead of a cord to connect telephone signals with a base unit, comprising:

an electrical interface, having a plurality of connectors for coupling audio and data signals with the wireless telephone;

a transceiver operable to communicate telephone calls via radio signals to the cordless telephone handset, said transceiver coupled to at least a first audio signal connector in said electrical interface, and a controller coupled to said transceiver, and coupled to at least a first data connector in said electrical interface, said controller operable to communicate data signals with the wireless telephone when coupled to said electrical interface, and operable to process telephone calls between the wireless telephone and the cordless telephone handset via said transceiver.

2. The docking station in claim 1, wherein said electrical interface is aligned with a socket in a case of the docking station, and further comprising at least a first removably mountable interface adapter, said interface adapter further comprising:

a docking station electrical interface adapted to connect with said electrical interface in said socket;

a wireless telephone cradle formed to received and support the wireless telephone, said cradle having a wireless telephone electrical interface adapted to connect with the wireless telephone, and an interface circuit operable to interconnect said docking station electrical interface with said wireless telephone electrical interface.

3. The docking station in claim 2, and wherein said interface circuit comprises electrical components operable to adapt wireless telephone signals to signals at said electrical interface.

4. The docking station in claim 1, further comprising a power supply coupled to at least a first connector in said electrical interface, and coupled to said transceiver and said controller.

5. The docking station in claim 4, wherein the wireless telephone operates from rechargeable batteries; and wherein said interface circuit couples said at least a first connector in said electrical interface to the wireless telephone, and is operable to charge the rechargeable batteries in the wireless telephone.

6. The docking station in claim 5, wherein the cordless telephone handset operates from rechargeable batteries, further comprising:
- a cordless telephone handset cradle disposed upon a case enclosing the docking station;
- a cordless telephone handset electrical interface aligned with said cordless telephone handset cradle, and wherein
- said power supply is coupled to at least a first conductor in said cordless telephone handset electrical interface, and is operable to charge the cordless telephone handset rechargeable batteries.

7. The docking station in claim 1, further comprising:
- a speakerphone having an audio interface and a control interface, and wherein
  - said controller is coupled to said speakerphone control interface and is operable to selectively coupled said speakerphone audio interface to said electrical interface audio signals, thereby enabling the speakerphone function for telephone calls on the wireless telephone while the wireless telephone is interfaced to said electrical interface.

8. A docking station for interconnecting telephone calls between a wireless telephone, which accesses telephone service from a wireless telephone network, and a cordless telephone handset, which employs radio waves instead of a cord to connect telephone signals with a base unit, wherein both of the wireless telephone and the cordless telephone handset operate from rechargeable batteries, comprising:
- a case;
- an electrical interface aligned with a socket in said case, and having a plurality of connectors for coupling power, audio and data signals with the wireless telephone;
- a first removably mountable interface adapter, said interface adapter further comprising:
  - a docking station electrical interface adapted to connect with said electrical interface in said socket;
  - a wireless telephone cradle formed to received and support the wireless telephone, said cradle having a wireless telephone electrical interface adapted to connect with the wireless telephone, and
  - an interface circuit operable to interconnect said docking station electrical interface with said wireless telephone electrical interface;
- a transceiver operable to communicate telephone calls via radio signals to the cordless telephone handset, said transceiver coupled to at least a first audio signal connector in said electrical interface, and
- a controller coupled to said transceiver, and coupled to at least a first data connector in said electrical interface, said controller operable to communicate data signals with the wireless telephone when coupled to said electrical interface, and operable to process telephone calls between the wireless telephone and the cordless telephone handset via said transceiver
- a power supply coupled to at least a first connector in said electrical interface, and coupled to said transceiver and said controller, and wherein said interface circuit couples said at least a first connector in said electrical interface to the wireless telephone, and is operable to charge the rechargeable batteries in the wireless telephone;
- a cordless telephone handset cradle disposed upon said case;
- a cordless telephone handset electrical interface aligned with said cordless telephone handset cradle, and wherein said power supply is coupled to at least a first conductor in said cordless telephone handset electrical interface, and is operable to charge the cordless telephone handset rechargeable batteries;
- a speakerphone having an audio interface and a control interface, and wherein
  - said controller is coupled to said speakerphone control interface and is operable to selectively coupled said speakerphone audio interface to said electrical interface audio signals, thereby enabling the speakerphone function for telephone calls on the wireless telephone while the wireless telephone is interfaced to said electrical interface.

9. The docking station in claim 8, and wherein said interface circuit comprises electrical components operable to adapt wireless telephone signals to signals at said electrical interface.

10. A method of interconnecting telephone calls between a wireless telephone, which accesses telephone service from a wireless telephone network, having a first electrical interface, and a cordless telephone handset, which employs radio waves instead of a cord to connect telephone signals with a base unit, using a docking station having a second electrical interface, the docking station having a transceiver operable to couple telephone calls, via radio waves, with the cordless telephone handset, wherein the second electrical interface has at least a first audio connector coupled to the transceiver and at least a first data connector coupled to a controller in the docking station, comprising the steps of:
- connecting the first electrical interface to the second electrical interface;
- receiving a ring data signal by the controller from the wireless telephone through the at least a first data connector, and
- in response to receiving the ring data signal, coupling audio signals between the at least a first audio connector and the cordless telephone handset through the transceiver.

11. A method of interconnecting telephone calls between a wireless telephone, which accesses telephone service from a wireless telephone network, having a first electrical interface, and a cordless telephone handset, which employs radio waves instead of a cord to connect telephone signals with a base unit, using a docking station having a second electrical interface, the docking station having a transceiver operable to couple telephone calls, via radio waves, with the cordless telephone handset, wherein the second electrical interface has at least a first audio connector coupled to the transceiver and at least a first data connector coupled to a controller in the docking station, and the controller is coupled to the transceiver, comprising the steps of:

connecting the first electrical interface to the second electrical interface;

entering a telephone number into a keypad on the cordless telephone handset;

communicating the telephone number to the controller via the transceiver;

establishing a wireless telephone call by sending the telephone number from the controller to the wireless telephone through the at least a first data connector, and coupling audio signals between the at least a first audio connector and the cordless telephone handset through the transceiver during the telephone call.

12. A method of transferring data between a wireless telephone, which accesses telephone service from a wireless telephone network, having a first electrical interface, and a cordless telephone handset, which employs radio waves instead of a cord to connect telephone signals with a base unit, using a docking station having a second electrical interface, the docking station having a transceiver operable to couple information, via radio waves, with the cordless telephone handset, and the docking station having a controller coupled to said second electrical interface and coupled to the transceiver, comprising the steps of:

detecting the presence of the wireless telephone at the docking station upon the connection of the first electrical interface to the second electrical interface;

transferring data from the wireless telephone to the transceiver by the controller;

transmitting said data by the transceiver to the cordless telephone handset, and storing said data in a memory in the cordless telephone handset.

* * * * *